Jan. 29, 1952      A. S. HOWE      2,583,571
POWER CUTTER FOR VINES, STRAWBERRY RUNNERS, AND THE LIKE
Filed Jan. 7, 1949      4 Sheets-Sheet 1
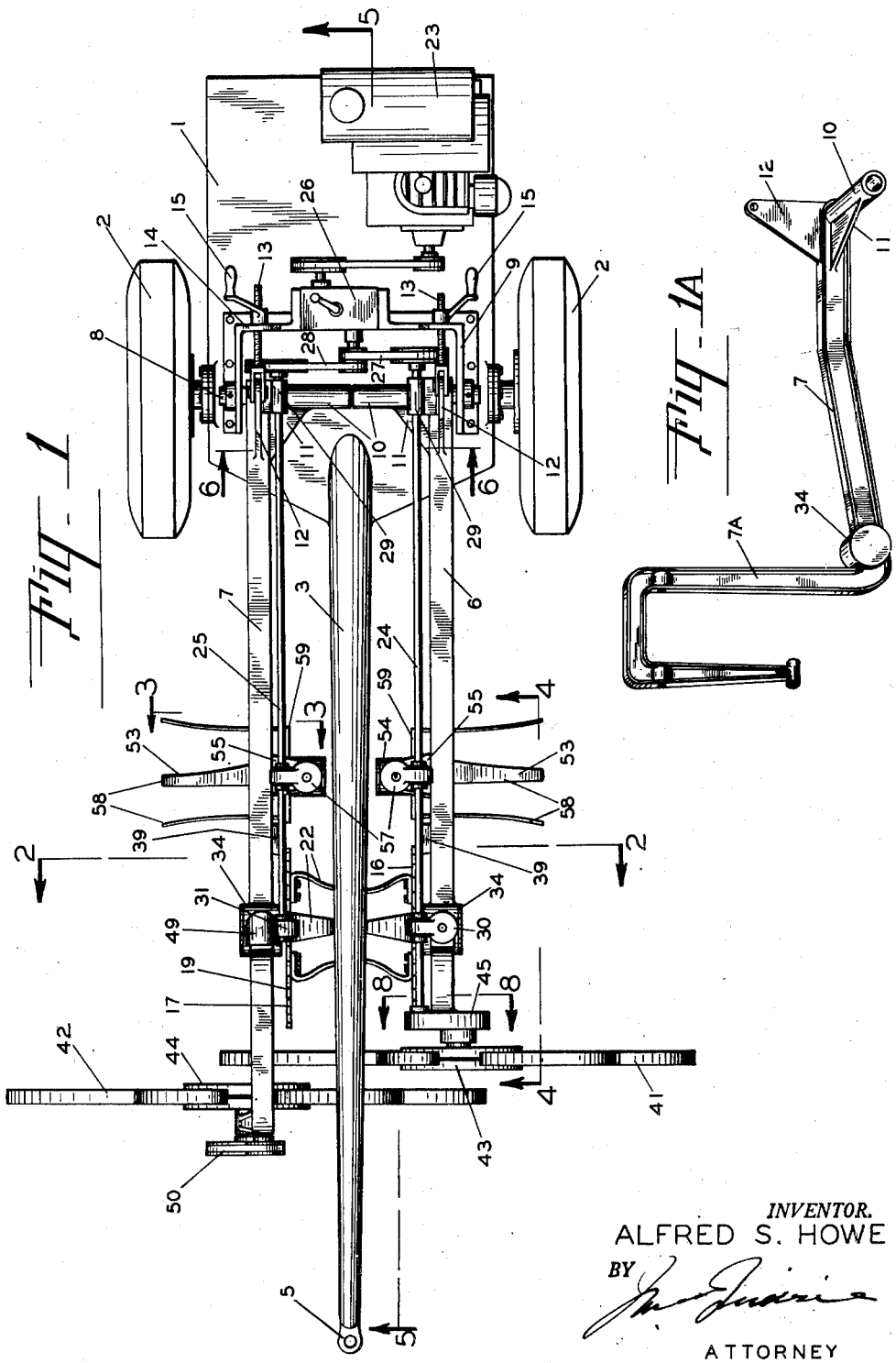
INVENTOR.
ALFRED S. HOWE
BY
ATTORNEY Jan. 29, 1952 A. S. HOWE 2,583,571
POWER CUTTER FOR VINES, STRAWBERRY RUNNERS, AND THE LIKE
Filed Jan. 7, 1949 4 Sheets-Sheet 2
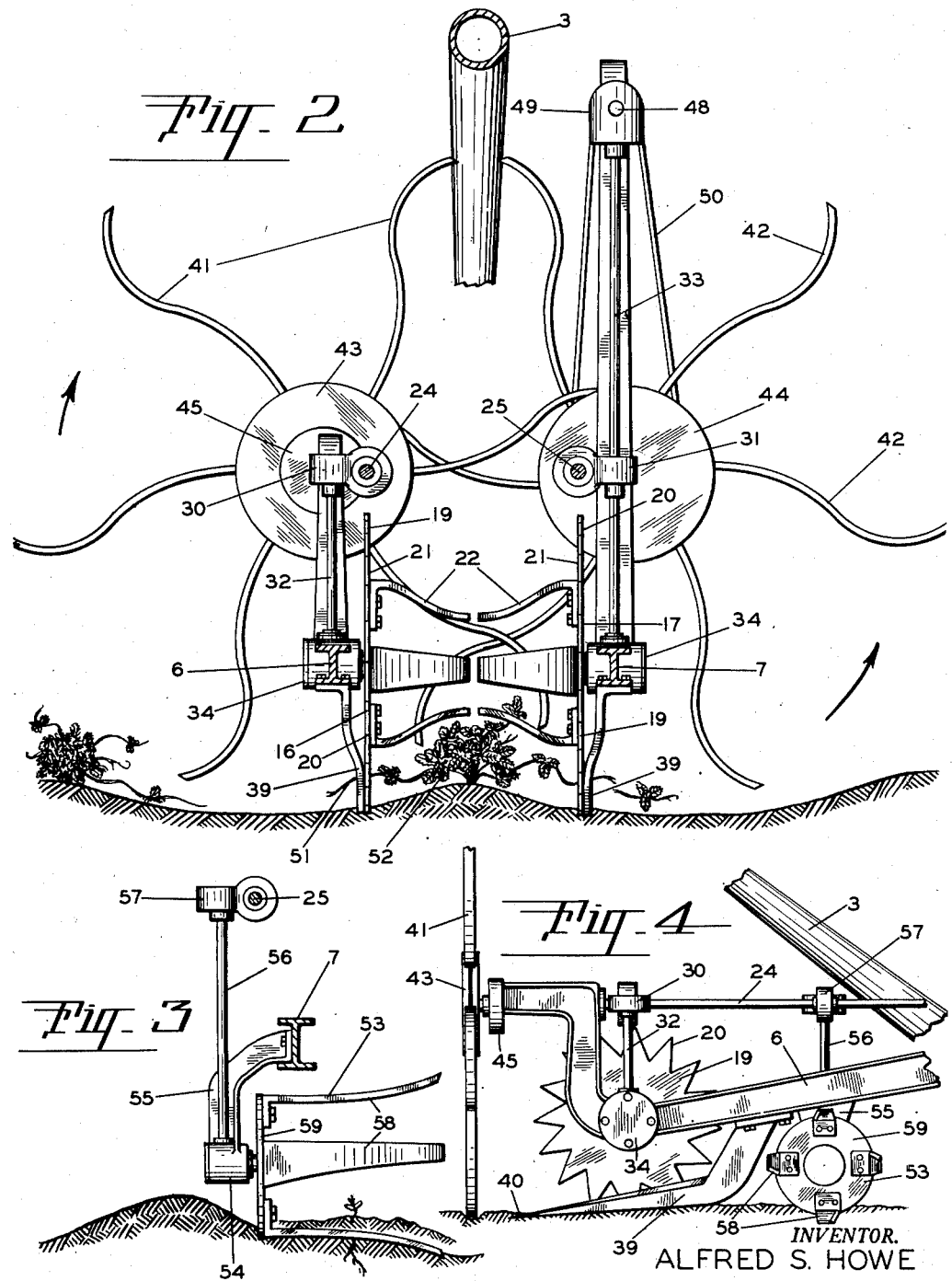
INVENTOR.
ALFRED S. HOWE
BY 
ATTORNEY

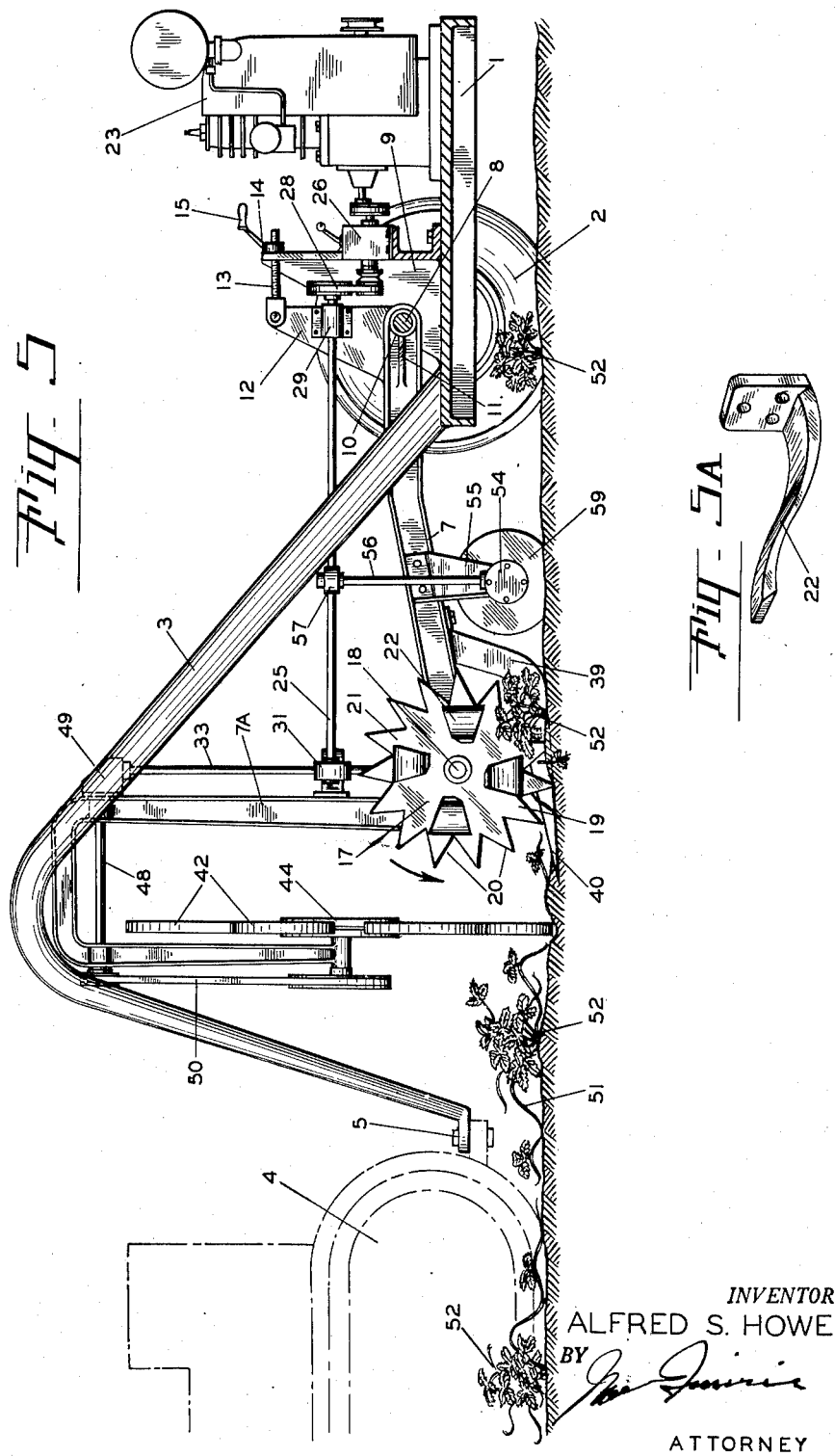

Jan. 29, 1952     A. S. HOWE     2,583,571
POWER CUTTER FOR VINES, STRAWBERRY RUNNERS, AND THE LIKE
Filed Jan. 7, 1949     4 Sheets-Sheet 4
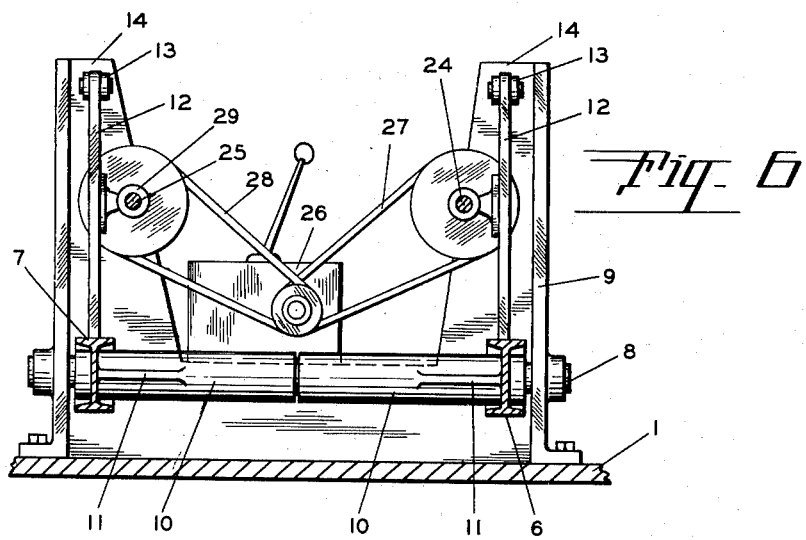
Fig. 6
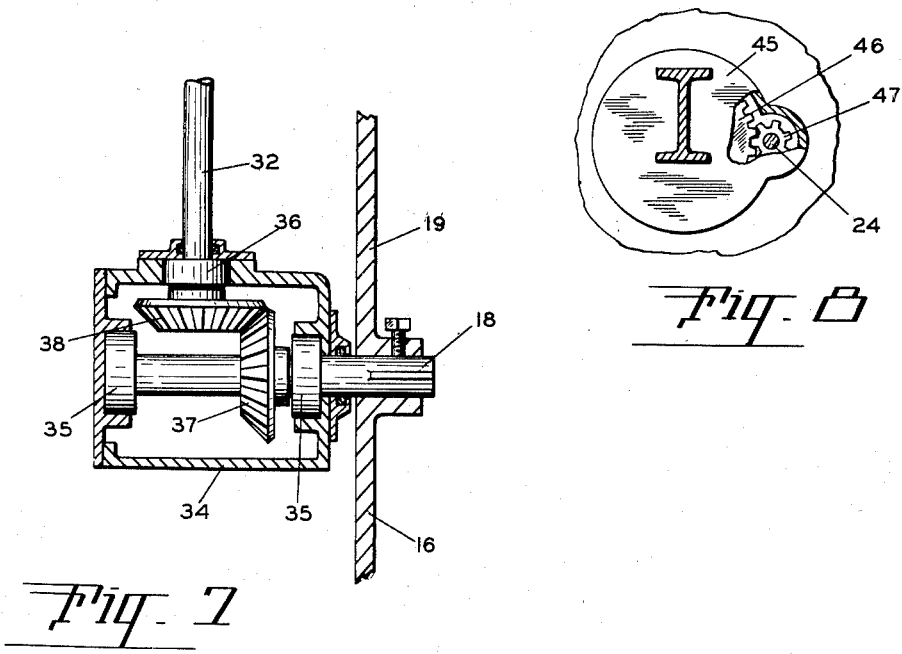
Fig. 7
Fig. 8
INVENTOR.
ALFRED S. HOWE
BY
ATTORNEY Patented Jan. 29, 1952

2,583,571

UNITED STATES PATENT OFFICE 2,583,571

POWER CUTTER FOR VINES, STRAWBERRY RUNNERS, AND THE LIKE

Alfred S. Howe, Silverton, Oreg.

Application January 7, 1949, Serial No. 69,681

10 Claims. (Cl. 97—12)

This invention relates to vine or runner cutters and is particularly adapted to be used in the cutting of strawberry vines or runners.

The primary object of my invention is to provide a machine that will trim the runners from strawberry plants.

A further object of the invention is to provide a machine that will cut the newly rooted roots from between the rows of strawberries.

A still further object of the invention is to provide means within the machine for pulling the runners from between the strawberry plants within the row into a position where they can be cut away from the plant by the machine.

And another object of the invention is to trim the leaves off the tops of the plants.

These and other incidental objects will be apparent in the drawings, specification and claims.

Referring to the drawings:

Figure 1 is a plan view of my new and improved vine cutting machine. In this view the strawberry plants have been omitted.

Figure 1A is a perspective view of one of the frame members.

Figure 2 is an end sectional view taken on line 2—2 of Figure 1, particularly illustrating the cutting head and vine moving reels, and showing the strawberry plants.

Figure 3 is a fragmentary detail sectional view, taken on line 3—3 of Figure 1.

Figure 4 is a fragmentary side view of the cutter head and vine moving reel, taken on line 4—4 of Figure 1.

Figure 5 is a sectional side elevation of the machine, taken on line 5—5 of Figure 1 showing the strawberry plants.

Figure 5A is a perspective view of one of the cutting blades of the rotor assemblies.

Figure 6 is a sectional end view taken on line 6—6 of Figure 1. In this view the motor has been omitted.

Figure 7 is an enlarged sectional detail of one of the driving units for driving the cutter heads.

Figure 8 is a detail fragmentary sectional view taken on line 8—8 of Figure 1, partially broken away for convenience of illustration.

Referring more specifically to the drawings:

My new and improved vine cutting machine consists of a base frame 1, mounted upon wheels 2 and having an arched tongue 3 fixedly secured thereto and adapted to connect to the tractor 4 at 5. Pivotally mounted to the frame 1 are a pair of beams 6 and 7 extending forwardly of the machine and adapted to support the cutter heads and vine moving reels. The beams 6 and 7 are pivotally mounted to the cross shaft 8, which is fixedly mounted within the upwardly extending frame 9.

Hubs 10 form part of the beams 6 and 7 and are braced by the gusset plates 11 affording great strength to the hub 10. The hubs 10 are adapted to be journalled to the cross shaft 8, best illustrated in Figures 1, 5 and 6. These hubs insure relatively perfect alignment of the beams 6 and 7 with the base frame 1. The position of the beams 6 and 7 relative to a horizontal plane is controlled by the bell cranks 12, which form part of the rear of the frames adjacent the hubs.

Pivotally connected to the upper ends of the bell cranks are eye-bolts 13 which extend through the upper ends 14 of the frame 9 and have the cranks 15 threaded thereon and adapted to move the bolt 13 and the bell cranks 12 away or towards the frame 9 raising or lowering the opposite ends of the beams 6 and 7.

Special vine cutting rotors 16 and 17 are journalled to the beams 6 and 7 by way of the stub shafts 18, referring particularly to Figure 7. The cutting rotors, consisting of disks 19, having cutting teeth 20 formed on their outer periphery. Bolted to their inner face 21, referring particularly to Figure 2, are specially shaped cutter blades 22. These cutter blades are so shaped as to trim the tops and leaves from the strawberry plants as well as cutting the runners extending upwardly therefrom. The rotors are driven at a relatively high rate of speed by the following driving mechanism.

Mounted upon the frame 1 of the machine is a power plant 23 adapted to drive the horizontal shafts 24 and 25 through the transmission 26 by way of the belts 27 and 28, referring particularly to Figures 1 and 6. These shafts are journalled within bearings 29 which are secured to the bell cranks 12 at their one end and within the gear boxes 30 and 31 at their opposite end. The gear boxes 30 and 31 have right angled gears operating therein and adapted to drive the vertical shafts 32 and 33.

A gear box housing 34 forms part of the beams 6 and 7 and have the stub shafts 18 journalled in bearings 35 and the lower end of the vertical shafts 32 and 33 journalled within bearings 36. Keyed to the shafts 18 are bevel gears 37 which are adapted to be driven by the bevel gears 38 from the vertical shafts 32 and 33. The above drive rotates the cutter units 16 and 17 as stated above at a relatively high rate of speed.

Shear blades 39 are fixedly secured to the beams 6 and 7, best illustrated in Figures 2, 4 and 5. These blades are adapted to contact the outer faces of the teeth 20 and extend forward to the points 40. These points travel under the ground surface slightly, gathering the runners of the strawberry plants directing them into the cutter teeth 20 where they are trimmed off.

Located between the plants within the rows of strawberries are runners also running longitudinal of the row. I have provided a method of pulling these runners away from between the plants by the rotor fingers 41 and 42. These rotor fingers are mounted to hubs 43 and 44 and are revolved by power means, the rotor fingers 41 are driven from the shaft 24, which extends through the gear box 30 and into the gear box 45 which is supported by the beam 6, best illustrated in Figures 1, 4 and 8.

The rotor fingers 41 are substantially flexible and rotate at a relatively slow rate of speed. A large gear 46 is keyed to the rotor shaft and driven by the pinion 47, keyed to the driving shaft 25. The rotor fingers 42 are driven by way of the vertical shaft 33, driving the cross shaft 48 by way of the gear box 49 and belt 50. The rotors are driven in the direction indicated by the arrows, and as they are rotated their fingers catch the runners 51 of the strawberry plants 52 pulling them away from between the plants transversely in the direction of the movement of the machine, at which time they are picked up by the point 40 of the shear and directed into the cutter teeth 20 of the cutting rotors 16, referring to Figure 2.

It has been found that the runners running crosswise of the rows of plants have roots taking hold into the soil between the rows. I have provided a second set of rotor cutters 53 which are mounted to the gear boxes 54, which in turn are supported by the brackets 55. The gear boxes 54 are similar to the gear box indicated in Figure 7 and are adapted to be driven by the vertical shafts 56, which extend down from the gear boxes 57 which in turn are driven by the driving shafts 24 and 25. The rotors 53 consist of cutting blades 58 mounted to the disks 59. These blades are rotated at a relatively high rate of speed cutting under the ground surface, thereby cutting the roots of the runners located between and adjacent the rows of the strawberry plants.

I will now describe the operation of my new and improved vine cutting machine, particularly in the cutting of the vines or runners on strawberry plants. The strawberry plants are indicated at 52 having the runners 51 extending in all directions beyond the plants. As the machine moves along the row of strawberry plants the points 40 of the shear 39 travel under the vines or runners extending transversely of the row from the plants. These runners are directed into the cutter teeth 20 which shear them off. The fingers or reels 41 and 42 revolving in the direction of the arrow, Figure 2, pull the runners or vine that extend between the plants and along the row away from the center of the rows towards the space between the rows where the point 40 of the shears can pick them up and direct them into the cutting teeth.

Next the roots or the runners that have taken hold between the rows of plants are cultivated or sheared off by the rotating rotors 53 and the cutter blades 58, thereby making a complete trimming of the plants. As stated before the blades 22 of the rotor 16 trim the tops of the plants, shaping them as the machine travels along.

I have provided means of adjusting the height of the rotors 16, shears 39 and the rotors 53 by being able to raise or lower the beams 6 and 7 supporting the said rollers separately or individually by the action of the cranks 15 adjusting the eye-bolt 13 and the position of the bell cranks 12 about the cross shaft 8 to which the beams are pivoted to. This becomes necessary when the space or aisles between the rows are of different elevations.

Although certain specific embodiments of the invention have been shown and described, it is obvious that many modifications thereof are possible. The invention, therefore, is not restricted except in so far as is necessitated by the prior art and by the spirit of the appended claims.

What I claim is:

1. A vine cutting implement comprising a frame supported by wheels, an attaching tongue extending from the frame, spaced apart beams pivotally mounted on the frame, said beams having overhanging extensions at their forward ends, rotary vine-gathering fingers mounted in the overhanging extensions, rotary vine cutters mounted on the beams in rear of the rotary vine-gathering fingers and disposed at right angles to same, vine-cutting elements extending inwardly from the rotary vine cutters, shear blades depending from the beams and disposed against the outer sides of the rotary vine cutters, and power transmission means on the frame to operate the rotary vine gathering fingers and rotary vine cutters.

2. A vine cutting implement comprising a frame supported by wheels, an attaching tongue extending forwardly of the frame, spaced apart beams pivotally mounted on the frame, rotary vine gathering fingers mounted transversely of and on each beam, the respective rotary vine gathering fingers on the beams being spaced apart and arranged in overlapping paths, stub shafts extending inwardly from each beam in rear of the vine gathering fingers, rotary vine cutters mounted on the stub shafts, a series of horizontally disposed vine cutters attached to and extending inwardly from the vine cutters on the stub shafts, and power means for operating the gathering fingers and cutters.

3. A vine cutting implement comprising a frame supported on wheels, standards rising from the frame, a pair of beams pivotally mounted on the standards, each beam having a vertical extension at its rear end, screws extending from the vertical extension to the standards on the frame, nuts engaging the screws to adjust the position of the beams with relation to the frame, gathering fingers mounted on each beam to transversely gather vines, and rotary vine cutters mounted on each beam in rear of and disposed at right angles to the vine gathering fingers, and a shear blade extending forwardly from each beam and in contact with the rotary cutters, the rotary cutters and the shear blades cooperating to sever transverse vines.

4. A vine cutting implement as defined in claim 3, wherein a series of substantially horizontal cutters are mounted on and extend inwardly from each rotary cutter.

5. A vine cutting implement comprising a pair of beams, each beam having an overhanging front portion, a series of vine gathering fingers mounted on the overhanging portion of each beam, the fingers on one beam overlapping the path of the fingers on the other beam, the fingers extending across the space between the pair of beams, and a series of vine cutters carried by the beams in rear of the vine gathering fingers and between the beams.

6. A vine cutting implement, comprising a frame supported by wheels, a shaft supported in the frame, a pair of spaced apart beams pivotally mounted on the shaft, an attaching tongue extending from the frame and forwardly beyond the beams, rotary vine gathering fingers mounted to operate transversely of and in front of the beams and under the attaching tongue, and a series of substantially horizontally disposed cutters carried by each beam and extending inwardly therefrom.

7. A vine cutting implement comprising a frame supported by wheels, a pair of spaced apart beams pivoted to the frame and extending forwardly therefrom, a series of vine gathering fingers mounted on the front end of each beam, the fingers on one beam overlapping and spaced from the fingers on the companion beam, a series of rotary vine cutters carried by each beam in rear of the vine cutting fingers, a motor on the frame, a pair of parallel shafts mounted on the beams, power transmission means between the motor and the pair of shafts, gearing between the shafts and the vine gathering fingers, gearing between the shafts and the vine cutters, and a shear blade depending from each beam and disposed outside of and against the vine cutters.

8. A vine cutting improvement comprising a frame supported on wheels, spaced apart beams mounted on the frame, rotary vine gathering fingers mounted transversely of and on each beam, the respective rotary vine gathering finger on the beams, being spaced apart and arranged in overlapping paths, means for slowly rotating the overlapping vine gathering fingers, a pair of rotary vine cutters mounted in rear of the vine gathering fingers, a series of horizontally disposed vine cutters attached to and extending inwardly from each of the vine cutters, means for rotating the vine cutters and the horizontally disposed vine cutters at a greater rate of speed than the speed of rotation of the vine gathering fingers.

9. A vine cutting implement as defined in claim 8, wherein each beam is provided with a forwardly extended shear blade, the shear blades contacting the rotary cutters and their forward ends terminating below the bottom of said rotary cutters to penetrate the earth below the surface thereof.

10. A vine cutting implement, as defined in claim 1, wherein the beams are pivotally mounted on the frame, and means between the frame and the beams for vertically adjusting the forward ends of the beams with respect to the frame.

ALFRED S. HOWE.

No references cited.